(12) United States Patent
Morishima (10) Patent No.: US 6,502,182 B1
(45) Date of Patent: Dec. 31, 2002

(54) DIGITAL SIGNAL PROCESSING DEVICE

(75) Inventor: Morito Morishima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/300,886

(22) Filed: Apr. 28, 1999

(30) Foreign Application Priority Data

May 1, 1998 (JP) .......................................... 10-122188

(51) Int. Cl.[7] .............................. G06F 7/38; G06F 9/44; G06F 9/302
(52) U.S. Cl. .............................. 712/35; 712/34; 712/36; 712/37; 712/38; 712/39; 712/221; 712/210; 708/523
(58) Field of Search ............................... 712/35, 34, 36, 712/37, 38, 39, 43, 210, 221, 222; 710/110, 126; 708/130, 523

(56) References Cited

U.S. PATENT DOCUMENTS 4,615,015 A  *  9/1986  Olander, Jr. et al. ........ 708/130
5,630,153 A  *  5/1997  Intrater et al. ................. 712/35

FOREIGN PATENT DOCUMENTS

JP        5298088        12/1993
JP        7219766        8/1995

* cited by examiner

*Primary Examiner*—Daniel H. Pan
(74) *Attorney, Agent, or Firm*—Pillsbury Winthrop LLP (57) ABSTRACT

A digital signal processing device applicable to a signal processing system using a CPU is mainly configured by an external memory and a digital signal processor (i.e., DSP), which are connected together using a data bus and an address bus. The external memory stores multiplier data and coefficient data as well as basic instructions. In the DSP, an ALU calculates addresses for accessing the external memory via the address bus. A bus control unit identifies the multiplier data, coefficient data and basic instructions respectively, which are read from the external memory. The DSP performs calculations containing multiplication using the multiplier data and coefficient data. The DSP is controlled in operations in response to a CPU mode and a DSP mode, one of which is selected by decoding the basic instruction(s) identified by the bus control unit. At the CPU mode, the basic instructions of sixteen bits are subjected to coding to produce high-speed instructions of thirty-two bits for controlling the DSP. At the DSP mode, high-speed instructions, which are stored inside of the DSP, are subjected to consecutive reading and are used for controlling the DSP. Such consecutive reading of the high-speed instructions is started by the basic instruction(s). Thus, it is possible to improve the processing speed and memory use efficiency with respect to the digital signal processing device.

18 Claims, 4 Drawing Sheets

DIGITAL SIGNAL PROCESSING DEVICE

BACKGROUND OF THE INVENTION

1. Field of the Invention

This invention relates to digital signal processing devices such as digital signal processors (DSP), which are applicable to signal processing systems using central processing systems (CPU).

This application is based on Patent Application No. Hei 10-122188 filed in Japan, the content of which is incorporated herein by reference.

2. Description of the Related Art

Some of the conventional digital signal processing devices are designed based on the so-called "Harvard Architecture". This architecture is suitable for the high speed calculations such as multiplication and is designed to have three memories. That is, two memories are used for storing coefficient data and multiplier data which are input to adders and multipliers and are used for addition and multiplication, while one memory is used for storing DSP instructions. The digital signal processing devices employing the aforementioned Harvard architecture have an advantage that speed of digital signal processing can be increased because both of the coefficient data and multiplier data can be simultaneously set to the adders and multipliers.

However, each of the aforementioned digital signal processors requires address spaces independently for the three memories respectively. For this reason, they have disadvantages that a number of address lines becomes large while an area (or size) of a chip should be enlarged. In other words, the three memories cannot mutually exchange the DSP instructions, coefficient data and multiplier data therebetween. So, even if the memory exclusively used for storing the multiplier data runs out vacant space thereof, it is impossible to use vacant space of the memory exclusively used for storing the coefficient data. So, the conventional digital signal processing devices suffer from a problem that a memory use efficiency is not so good.

SUMMARY OF THE INVENTION

It is an object of the invention to provide a digital signal processing device which is capable of improving speed of digital signal processing and memory use efficiency and which is applicable to a signal processing system using a CPU.

According to this invention, a digital signal processing device applicable to a signal processing system using a CPU is mainly configured by an external memory and a digital signal processor (i.e., DSP), which are connected together using a data bus and an address bus.

The external memory stores multiplier data and coefficient data as well as basic instructions. In the DSP an ALU calculates addresses for accessing the external memory via the address bus. A bus control unit identifies the multiplier data, coefficient data and basic instructions respectively, which are read from the external memory. The DSP performs calculations containing multiplication using the multiplier data and coefficient data. The DSP is controlled in operations in response to a CPU mode and a DSP mode, one of which is selected by decoding the basic instruction(s) identified by the bus control unit. At the CPU mode, the basic instructions of sixteen bits are subjected to coding to produce high-speed instructions of thirty-two bits for controlling the DSP. At the DSP mode, high-speed instructions, which are stored in an internal memory of the DSP, are subjected to consecutive reading and are used for controlling the DSP. Such consecutive reading of the high-speed instructions is started by the basic instruction(s).

Because the digital signal processing device uses the external memory for storing the multiplier data and coefficient data as well as the basic instructions of sixteen bits while using an internal memory for storing the high-speed instructions of thirty-two bits, it is possible to improve the memory use efficiency. In addition, because the high-speed instructions are subjected to consecutive reading at the DSP mode, it is possible to reduce the access time of the high-speed instructions, in other words, it is possible to avoid reduction of the processing speed of the DSP.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the drawings.

Figure 1:
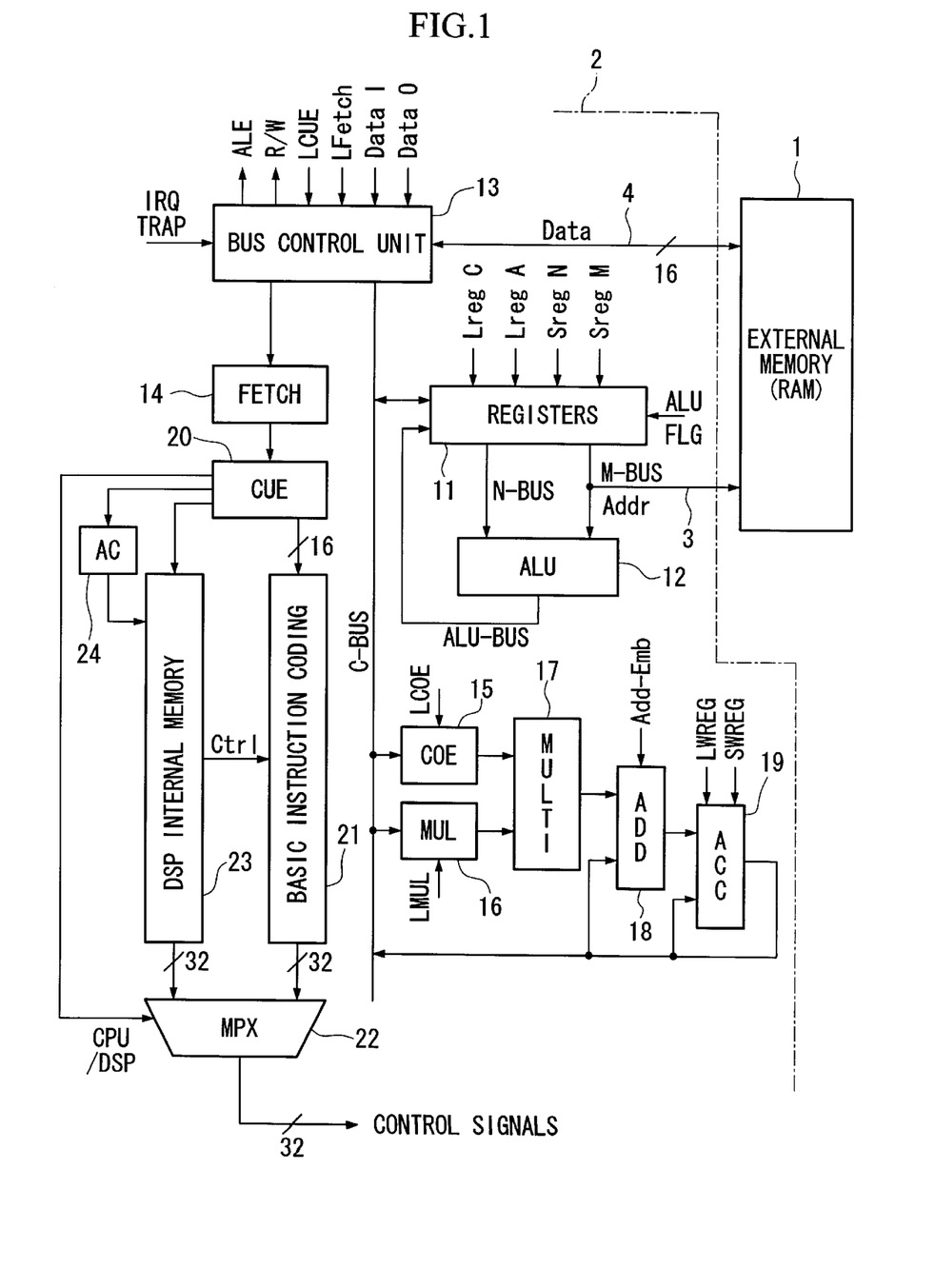
FIG. 1 is a block diagram showing a configuration of a signal processing system employing a digital signal processing device in accordance with an embodiment of the invention.

FIG. 1 is a block diagram showing a configuration of a signal processing system employing a digital signal processing device (i.e., DSP) in accordance with an embodiment of the invention.

Figure 2:
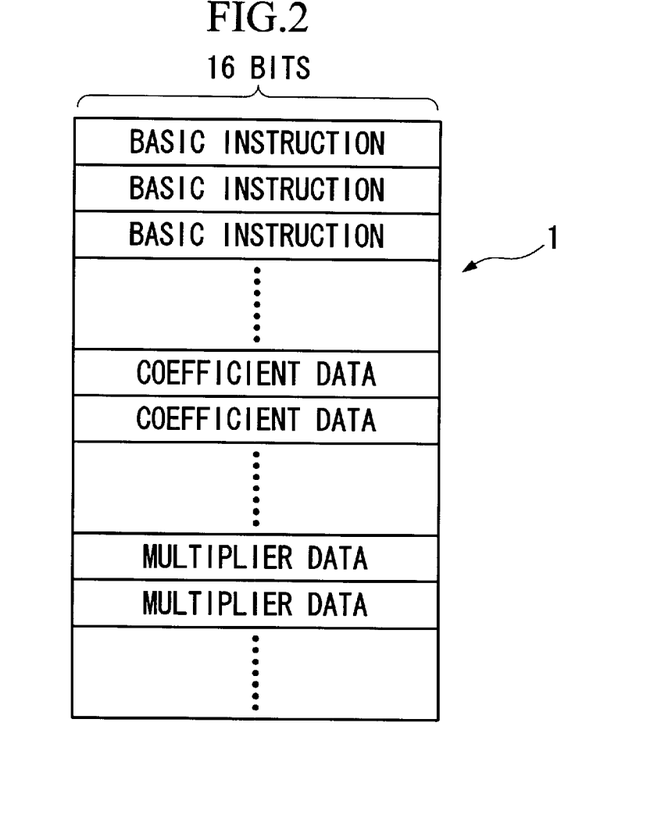
FIG. 2 is a memory map showing stored content of an external memory shown in FIG. 1.

The signal processing system of FIG. 1 is basically configured using an external memory 1 and a DSP 2 (which is provided as the digital signal processing device), which are connected together using an address bus 3 and a data bus 4. The external memory 1 is configured by a RAM or ROM. As shown in FIG. 2, the external memory 1 stores basic instructions, coefficient data and multiplier data, each of which is configured by sixteen bits, for example. The external memory 1 can be modified to store high-speed instructions, details of which will be described later. Herein, the high-speed instructions are divided when being stored in the external memory 1. To actualize prescribed signal processing, the DSP 2 performs operational processes using the coefficient data and multiplier data stored in the external memory 1.

The DSP 2 is configured as follows:

Registers 11 are provided to store addresses with regard to the external memory 1 as well as data which are read from the external memory 1. As the registers 11, there are provided working registers (WR1, WR2), a base pointer (BP), an index X (IX), an index Y (IY), a stack pointer (SP) and a program counter (PC), for example. All of the base pointer, index X, index Y, stack pointer and program counter correspond to registers which store data for creating addresses for the external memory 1. Those data are supplied to an arithmetic and logic unit (i.e., ALU) 12 via "M-BUS" and "N-BUS". The ALU 12 performs addition of predetermined values to make increments and address jumps for the aforementioned registers (or pointers). Then, operational results produced by the ALU 12 are transferred to the registers via an ALU-BUS. Herein, a pointer value that the ALU 12 supplies to the M-BUS is provided onto the address bus 3 as an address of the external memory 1. The pointers and the ALU 12 cooperate together to form an external address creation unit.

The DSP 2 inputs the basic instructions and data given from the external memory 1 via the data bus 4. The basic instructions and data are supplied to a bus control unit 13 which acts as an identification unit. The bus control unit 13 identifies the data input thereto. When inputting the basic instructions, the bus control unit 13 transfers them to a fetch register 14. When inputting the data, the bus control unit 13 supplies them onto a C-BUS. Then, the data supplied to the C-BUS are delivered and stored in the registers 11 as well as a coefficient register (COE) 15 and a multiplier register (MUL) 16 in accordance with control signals. The data stored in the registers 15, 16 are subjected to operational processes by an operation unit which is configured by a multiplier 17, an adder 18 and an accumulator 19. Then, results of the operational processes are supplied back to the C-BUS, by which they are delivered and stored in other registers (not shown).

The basic instructions fetched to the fetch register 14 are transferred to a cue register 20 within a same cycle. The basic instructions (each configured by sixteen bits) stored in the cue register 20 are subjected to coding by a basic instruction coding circuit 21 in order that the basic instructions will be matched with a number of control signals used inside of the DSP 2. Thus, the basic instructions of sixteen bits are converted to high-speed instructions each configured by thirty-two bits, which are supplied to a first input of a multiplexer 22. A second input of the multiplexer 22 receives high-speed instructions of thirty-two bits which are given from a DSP internal memory 23. At a basic instruction mode (or CPU mode) which will be described later, the multiplexer 22 selects the instructions of thirty-two bits, which are produced by converting the basic instructions in an executable form by the basic instruction coding circuit 21. At a high-speed instruction mode (or DSP mode), the multiplexer 22 selects the high-speed instructions given from the DSP internal memory 23. In order to do so, an instruction for switching over the modes is contained in a basic instruction set. So, the cue register 20 decodes such an instruction to produce a mode switching signal "CPU/DSP". Using the mode switching signal CPU/DSP, the multiplexer 22 is controlled so that the modes are switched over. In addition, the cue register 20 outputs a start instruction to the DSP internal memory 23.

Figure 3:
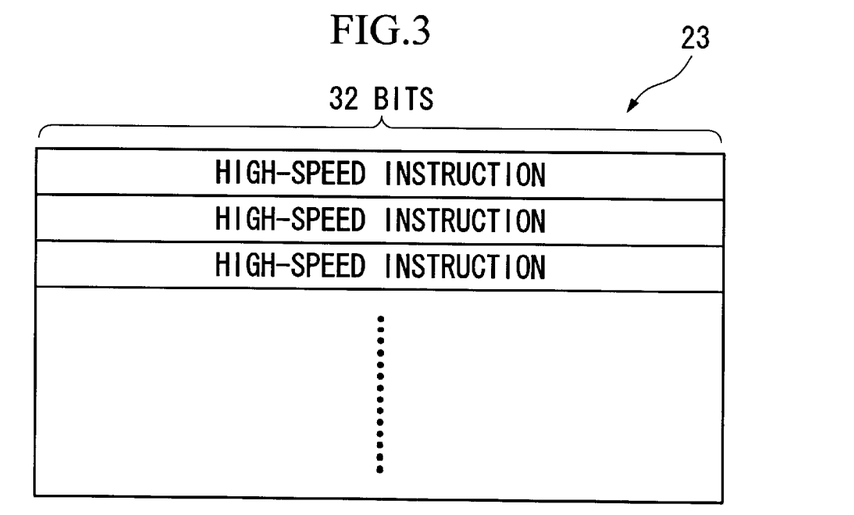
FIG. 3 is a memory map showing stored content of a DSP internal memory shown in FIG. 1.

The DSP internal memory 23 stores a number of high-speed instructions of thirty-two bits as shown in FIG. 3, for example. Herein, one high-speed instruction is capable of controlling all of the multiplier 17 and the ALU 12 as well as the registers 11, 15, 16. For example, the high-speed instruction contains a high-efficiency multiplication instruction, which enables multiplication to be executed. An address counter (AC) 24 receives the start instruction together with a start address from the cue register 20. So, the address counter 24 produces consecutive addresses based on the start address. Using the consecutive addresses, a series of high-speed instructions are consecutively read from the DSP internal memory 23. The DSP internal memory 23 is configured by a RAM or ROM. If the DSP internal memory 23 is configured by a RAM, it loads the high-speed instructions from the external at a system start mode.

Next, a description will be given with respect to operations of the signal processing system of FIG. 1.

Figure 4A:
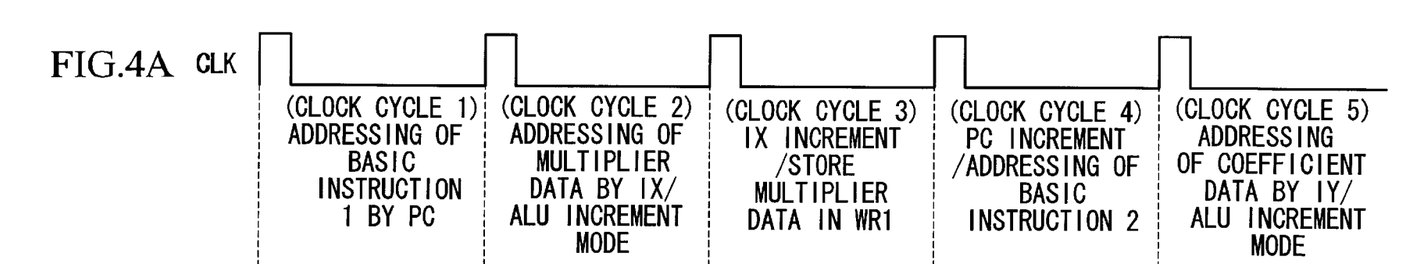
FIG. 4A is a time chart showing clock pulses which repetitively occur in a lapse of time.
Figure 4B:
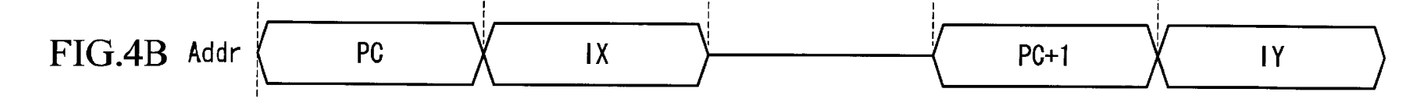
FIG. 4B is a time chart showing contents of addresses of the external memory which are sequentially changed over at a basic instruction mode.
Figure 4C:
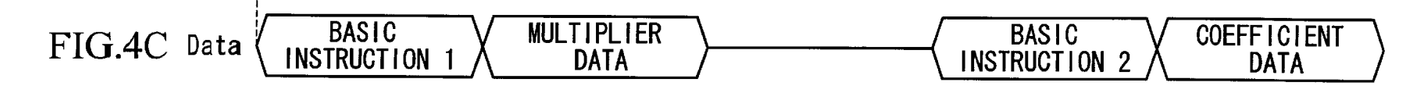
FIG. 4C is a time chart showing contents of data which are sequentially read from the external memory at the basic instruction mode.

FIG. 4A, FIG. 4B and FIG. 4C are time charts used for explaining operations of the signal processing system at the basic instruction mode. Specifically, FIG. 4A shows clock pulses which repetitively occur in response to clock cycles 1, 2, 3, 4 and 5. FIG. 4B shows a content of address (Addr) on the address bus 3, while FIG. 4C shows a content of data (Data) on the data bus 4.

At first, a value of the program counter (PC) provided within the registers 11 is output onto the address bus 3, while data of the external memory 1 are output onto the data bus 4. If the bus control unit 13 identifies the data as a basic instruction "1", such a basic instruction 1 is input to the basic instruction coding circuit 21 via the fetch register 14 and the cue register 15. Herein, the basic instruction 1 is subjected to coding, by which control signals required to execute such instruction are produced. Those control signals control gates (not shown) to open or close.

Suppose that the basic instruction 1 is a load instruction to load "data X" (e.g., multiplier data). In this case, the control signals, produced by the aforementioned coding, control the registers 11 and the ALU 12 in the clock cycle 2. That is, content (IX) of the index X (hereinafter, referred to as "IX register") provided within the registers 11 is output onto the address bus 3 via the M-BUS. At the same, time, the ALU 12 is placed in an increment mode so that increment data of "IX+1" is output onto the ALU-BUS. In the next clock cycle 3, the increment data are transferred to and stored in the IX register via the ALU-BUS. At the same time, the multiplier data read from the external memory 1 are transferred to and stored in the working register WR1 within the registers 11 by means of the bus control unit 12 and the C-BUS.

In the clock cycle 4, the value of the program counter PC is subjected to increment by the ALU 12. At the same time, the DSP 2 performs addressing on the external memory 1 by use of the M-BUS and the address bus 3. Thus, the DSP 2 reads a next basic instruction "2" from the external memory 1. If such a basic instruction 2 is a load instruction to load "data Y" (e.g., coefficient data), such coefficient data are read from the external memory 1 in accordance with content (IY) of the index Y (hereinafter, referred to as "IY register") within the registers 11.

As described above, at the basic instruction mode, the program counter PC performs addressing on the external memory 1, from which corresponding data are read and are then renewed by the AUL 12. Thus, by using the basic instructions, it is possible to actualize jump instructions such as conditional jump and jump of the coefficient table with ease. Incidentally, the basic instructions do not always perform coding on all of the control signals. So, it may be impossible to fully demonstrate all the functions of the DSP 2. However, the basic instructions are effective for the access to the external memory 1 with respect to the conditional jump and branch instruction, for example.

Figure 4D:
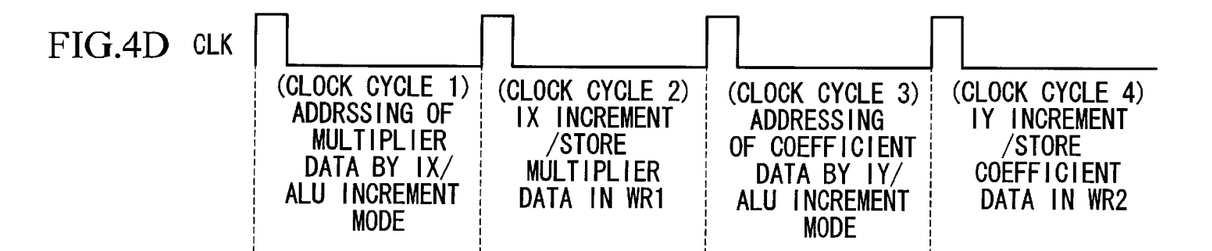
FIG. 4D is a time chart showing clock pulses.
Figure 4E:
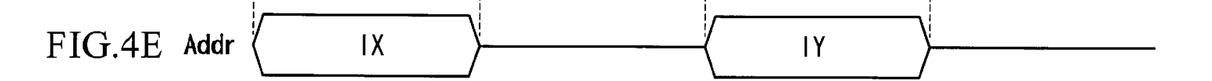
FIG. 4E is a time chart showing contents of addresses for the DSP internal memory at a high-speed instruction mode.
Figure 4F:
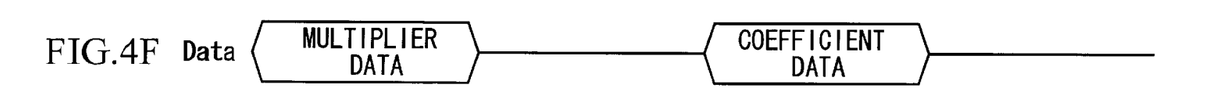
FIG. 4F is a time chart showing contents of data which are read from the DSP internal memory at the high-speed instruction mode.

FIG. 4D, FIG. 4E and FIG. 4F are time charts for explaining operations of the signal processing system at the high-speed instruction mode.

In order to improve the signal processing performance that the DSP originally possesses, it is necessary to execute high-speed instructions provided inside of the DSP. The high-speed instructions are stored in the DSP internal memory 23 in advance. If the DSP internal memory 23 is configured by the RAM, a setup instruction is added to the basic instruction. So, at a setup mode of the system, the DSP 2 loads the high-speed instructions from the external memory 1.

Based on the basic instruction, the DSP 2 uses the cue register 20 to set a start address for the DSP internal memory 23. Then, the DSP 2 starts consecutive read operations of the high-speed instructions from the DSP internal memory 23. Thereafter, the address counter 24 produces consecutive addresses following the start address. So, high-speed instructions are consecutively read from the DSP internal memory 23 in accordance with the consecutive addresses. Those high-speed instructions contain almost all of the control signals so that the DSP is capable of demonstrating its performance sufficiently. The DSP internal memory 23 is of a self-running type, so it is unnecessary to provide address designation cycles designated by the program counter PC. Thus, the ALU 12 is capable of concentrating on calculations to produce addresses for the multiplier data and coefficient data. For this reason, the DSP 2 using the high-speed instructions is capable of performing operations at a speed higher than speed of the DSP using the basic instructions. A return from the high-speed instruction mode is made by a high-speed instruction by which a basic instruction representing a return instruction is loaded into the cue register 20.

Incidentally, it may be possible to actualize similar operations of the basic instructions by the high-speed instructions stored inside of the DSP 2. However, the high-speed instructions tend to have a longer word length. So, if the DSP internal memory 23 is designed to store simple instructions such as the basic instructions, it has an increased memory access time, which in turn reduces the cost performance of the system as well as memory use efficiency. It can be said that a large capacity is not required for storing "true" high-speed instructions contributing to the digital signal processing that truly require high-speed operations. Therefore, by storing such high-speed instructions in the DSP internal memory 23, it is possible to suppress an increase of the capacity of the DSP internal memory 23. Basically, flexibility in processing of the basic instructions depend on capacity of the external memory 1. To increase the memory use efficiency, the external memory 1 stores "compressed" basic instructions. As a result, it is possible to improve the cost performance of the system as a whole.

Figure 5:
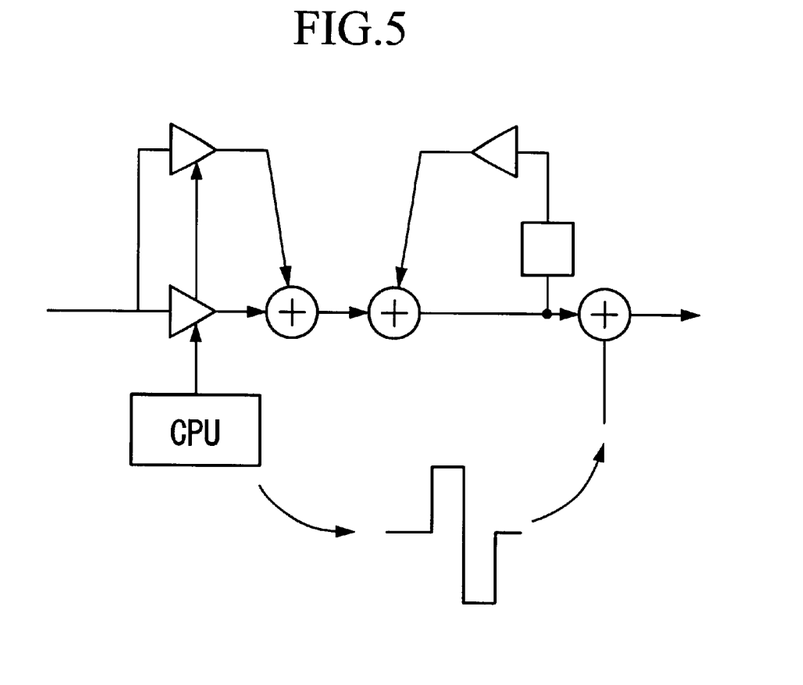
FIG. 5 is a circuit diagram showing an example of a circuit for a digital filter whose coefficient is changed over by a CPU.

Switching of the basic instruction mode and high-speed instruction mode is applicable to a variety of technical fields such as the search sequence of CD and automatic adjustment of gain and offset value. For example, FIG. 5 shows an example of a circuit which is used for the search sequence and in which disturbance is adequately applied to the coefficient of the digital filter. In the case where the coefficient data are changed at a specified timing, "coefficient table jump" is needed. In the normal system, the CPU operates to switch over the coefficient tables. According to the system of the present embodiment, the basic instruction is capable of enabling the table jump, so only one DSP is required to actualize a capability of coping with the aforementioned case.

Figure 6:
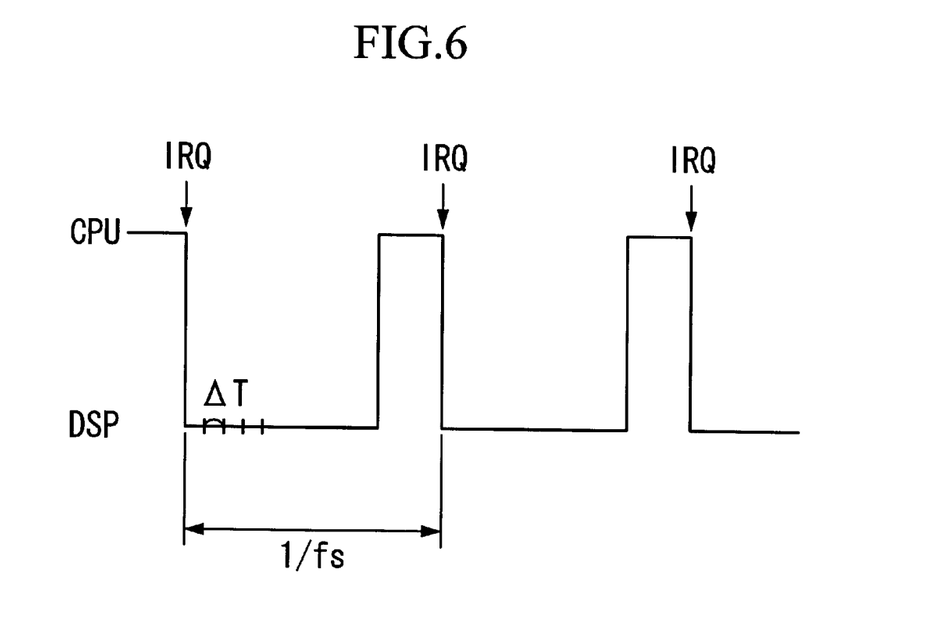
FIG. 6 is time chart showing an example of digital signal processing in which a DSP process is executed by interruption of a CPU operation.

By the way, the switching of the two modes can be actualized by an interrupt signal. For example, FIG. 6 shows an example of operation of a system in which an interrupt signal IRQ is given with respect to the CPU operation within the sampling period 1/fs of the digital signal to be processed so that the DSP process is executed. In such a system, an interrupt signal IRQ/TRAP is input to the bus control unit 13, so that an interrupt instruction is loaded into the cue register 20. Thus, the DSP 2 switches over the mode thereof from the basic instruction mode to the high-speed instruction mode. Then, when completing operation of the high-speed instruction mode, the DSP 2 returns to the basic instruction mode.

The signal processing system of this invention is designed in such a way that the basic instructions and data which require flexibility are stored in the external memory 1 while the DSP instructions which require high-speed performance are stored in the DSP internal memory 23 as the high-speed instructions. Thus, it is possible to improve the high-speed performance as well as the memory use efficiency in the signal processing system.

As described heretofore, this invention has a variety of technical features and effects, which will be described below.

(1) According to this invention, an internal memory for storing high-speed instructions whose word lengths are longer than the basic instructions is provided inside of the digital signal processing device. In addition, an address counter performs consecutive reading on the high-speed instructions, while other data such as the coefficient data and multiplier data are commonly stored in an external memory. Further, the external memory stores basic instructions together with the data. So, using the basic instructions, this invention activates the consecutive reading of the high-speed instructions. Therefore, after the basic instructions are used to start the consecutive reading of the high-speed instructions, the coefficient data and multiplier data are sequentially read from the external memory and are loaded into the digital signal processing device in accordance with the high-speed instructions consecutively read from the internal memory, wherein the prescribed operations or calculations are executed.

(2) This invention provides data access with regard to the external memory, independently of access to the external memory. Herein, the data access is made in response to the consecutive reading of the high-speed instructions from the internal memory. For this reason, this invention does not need all of processes regarding the reading, decoding and increment of the program counter which are required for reading the high-speed instructions from the external memory. Hence, it is possible to improve the processing speed of the digital signal processing device.

(3) All of the multiplier data and coefficient data are stored in the same external memory, which is accessed using the common address bus and common data bus.

Therefore, it is possible to reduce a number of buses while reducing the chip size. In addition, both of the data share the address spaces, so it is possible to improve the memory use efficiency. Even if this invention lacks a capability of performing parallel access on both of the data which commonly share the buses, this invention is capable of reducing the time required for the access process of the high-speed instructions. Thus, it is possible to avoid reduction of the processing speed.

(4) This invention has a major technical feature in providing different memories independently for storing the data and instructions. That is, the external memory is provided to store the data while the internal memory is provided to store the high-speed instructions. Normally, in order to increase the signal processing performance (i.e., amount of processing executed per unit time) of the DSP, it is necessary to elongate the bit lengths of the DSP instructions. Because, by elongating them, it is possible to control a more number of gates. On the other hand, the data do not require a so many number of bits. For this reason, if the DSP instructions having long bit lengths and the data are both stored in the same external memory, the memory space should be designed to be suited to the DSP instructions having long data lengths. In that case, approximately a half of the memory area for storing the data are not used, so the memory use efficiency should be reduced. This invention is provided to avoid such a problem. That is, this invention is designed such that the high-speed instructions are stored in the internal memory, so even if the bit lengths of the high-speed instructions are long, they do not influence the memory space of the external memory. In addition, by improving the machine clock of the internal memory, it is possible to further improve the signal processing performance.

(5) The basic instructions can be made in a simple form which is capable of instructing the consecutive reading of the high-speed instructions from the internal memory to start or end. So, it is unnecessary to elongate the bit lengths of the basic instructions so much. Therefore, it is possible to store the basic instructions together with the data in the external memory without troubles. By allocating simple instructions such as branch instructions and jump instructions to the basic instructions, it is possible to provide the "highly-value-added" device and system in which the CPU functions are added to the DSP functions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A digital signal processing device connected to an external memory, which stores at least basic instructions and data, by means of an address bus and a data bus, said digital signal processing device comprising:

external address creation means for creating addresses with regard to the external memory;

identification means for receiving and identifying the basic instructions and data respectively, which are read from the external memory in accordance with the addresses created by the external address creation means;

operation means for performing an operational process on the data which are identified by the identification means;

an internal memory for storing high-speed instructions each of which has a word length which is longer than a word length of each of the basic instructions; and an address counter for consecutively reading the high-speed instructions from the internal memory.

2. The digital signal processing device according to claim 1, wherein the high-speed instructions are composed of control signals.

3. The digital signal processing device according to claim 1, wherein an internal memory data bus width is greater than an external memory data bus width.

4. A digital signal processing device connected to an external memory, which stores at least basic instructions and data, by means of an address bus and a data bus, said digital signal processing device comprising:

external address creation means for creating addresses with respect to the external memory;

identification means for receiving and identifying the basic instructions and data respectively, which are read from the external memory in accordance with the addresses created by the external address creation means;

operation means for performing an operational process on the data which are identified by the identification means;

an internal memory for storing high-speed instructions each of which has a word length which is longer than a word length of each of the basic instructions, wherein the high-speed instructions contain a high-efficiency multiplication instruction that enables multiplication to be executed at a high speed as compared with the basic instructions; and an address counter for consecutively reading the high-speed instructions from the internal memory.

5. A digital signal processing device connected to an external memory, which stores at least basic instructions and data, by means of an address bus and a data bus, said digital signal processing device comprising:

external address creation means for creating addresses with respect to the external memory;

identification means for receiving and identifying the basic instructions and data respectively, which are read from the external memory in accordance with the addresses created by the external address creation means;

operation means for performing an operational process on the data which are identified by the identification means;

an internal memory for storing high-speed instructions each of which has a word length which is longer than a word length of each of the basic instructions;

an address counter for consecutively reading the high-speed instructions from the internal memory;

basic instruction conversion means for converting the basic instructions given from the external memory to instructions of an executable form; and selection means for selecting the instructions of the executable form produced by the basic instruction conversion means at a basic instruction mode to enable operations in accordance with the basic instructions, the selection means selecting the high-speed instructions read from the internal memory at a high-speed instruction mode to enable operations in accordance with the high-speed instructions.

6. A signal processing system comprising:
an external memory for storing at least basic instructions and data; and
a digital signal processing device which is connected to the external memory by means of an address bus and a data bus,
wherein said digital signal processing device comprises
external address creation means for creating addresses with regard to the external memory,
identification means for receiving and identifying the basic instructions and data respectively, which are read from the external memory in accordance with the addresses created by the external address creation means,
operation means for performing an operational process on the data which are identified by the identification means;
an internal memory for storing high-speed instructions each of which has a word length which is longer than a word length of each of the basic instructions, and
an address counter for consecutively reading the high-speed instructions from the internal memory.

7. The digital signal processing device according to claim 6, wherein the high-speed instructions are composed of control signals.

8. The digital signal processing device according to claim 6, wherein an internal memory data bus width is greater than an external memory data bus width.

9. A digital signal processing device comprising:
an external memory for storing multiplier data and coefficient data as well as basic instructions; and
a digital signal processor which is connected with the external memory by a data bus and an address bus,
wherein the digital signal processor comprises
address creation means for creating addresses for accessing the external memory via the address bus,
identification means for receiving the multiplier data and the coefficient data as well as the basic instructions from the external memory via the data bus so as to identify the basic instructions from the multiplier data and the coefficient data,
calculation means for performing calculations containing multiplication using the multiplier data and the coefficient data,
an instruction reception device to receive the basic instructions identified by and outputted by the identification means,
mode selecting means for decoding the basic instructions received from the instruction reception device, so as to select either a CPU mode or a DSP mode for the digital signal processor, and
control means for controlling the digital signal processor on the basis of high-speed instructions in response to the CPU mode or the DSP mode which is selected by the mode selecting means.

10. A digital signal processing device comprising:
an external memory for storing multiplier data and coefficient data as well as basic instructions; and
a digital signal processor which is connected with the external memory by a data bus and an address bus,
wherein the digital signal processor comprises
address creation means for creating addresses for accessing the external memory via the address bus, wherein the address creation means is configured using an ALU which calculates the addresses,
identification means for receiving the multiplier data and the coefficient data as well as the basic instructions from the external memory via the data bus so as to identify the basic instructions from the multiplier data and the coefficient data,
calculation means for performing calculations containing multiplication using the multiplier data and the coefficient data,
an instruction reception device to receive the basic instructions identified by and outputted by the identification means,
mode selecting means for decoding the basic instructions received from the instruction reception device, so as to select either a CPU mode or a DSP mode for the digital signal processor, and
control means for controlling the digital signal processor on the basis of high-speed instructions in response to the CPU mode or the DSP mode which is selected by the mode selecting means.

11. A digital signal processing device comprising:
an external memory for storing multiplier data and coefficient data as well as basic instructions; and
a digital signal processor which is connected with the external memory by a data bus and an address bus,
wherein the digital signal processor comprises
address creation means for creating addresses for accessing the external memory via the address bus,
identification means for receiving the multiplier data and the coefficient data as well as the basic instructions from the external memory via the data bus so as to identify the basic instructions from the multiplier data and the coefficient data,
calculation means for performing calculations containing multiplication using the multiplier data and the coefficient data,
an instruction reception device to receive the basic instructions identified by and outputted by the identification means,
mode selecting means for decoding the basic instructions received from the instruction reception device, so as to select either a CPU mode or a DSP mode for the digital signal processor, and
control means for controlling the digital signal processor on the basis of high-speed instructions in response to the CPU mode or the DSP mode which is selected by the mode selecting means, wherein the control means comprises
coding means for coding the basic instructions to produce first high-speed instructions at the CPU mode,
an internal memory for storing second high-speed instructions,
an address counter for performing consecutive reading of the second high-speed instructions from the internal memory at the DSP mode, and
selection means for selecting the first high-speed instructions to control the digital signal processor at the CPU mode or for selecting the second high-speed instructions to control the digital signal processor at the DSP mode.

12. A digital signal processing device comprising:
an external memory for storing multiplier data and coefficient data as well as basic instructions, wherein each of the basic instructions is configured by sixteen bits while each of the high-speed instructions is configured by thirty-two bits; and a digital signal processor which is connected with the external memory by a data bus and an address bus, wherein the digital signal processor comprises address creation means for creating addresses for accessing the external memory via the address bus, identification means for receiving the multiplier data and the coefficient data as well as the basic instructions from the external memory via the data bus so as to identify the basic instructions from the multiplier data and the coefficient data, calculation means for performing calculations containing multiplication using the multiplier data and the coefficient data, an instruction reception device to receive the basic instructions identified by and outputted by the identification means, mode selecting means for decoding the basic instructions received from the instruction reception device, so as to select either a CPU mode or a DSP mode for the digital signal processor, and control means for controlling the digital signal processor on the basis of high-speed instructions in response to the CPU mode or the DSP mode which is selected by the mode selecting means.

13. A digital signal processing device connected to an external memory, which stores at least basic instructions and data, by means of an address bus and a data bus, said digital signal processing device comprising:

external address creation means for creating addresses with respect to the external memory;

identification means for receiving and identifying the basic instructions and data respectively, which are read from the external memory in accordance with the addresses created by the external address creation means;

operation means for performing an operational process on the data which are identified by the identification means;

an internal memory for storing high-speed instructions each of which has a word length which is longer than a word length of each of the basic instructions;

an address counter for consecutively reading the high-speed instructions from the internal memory;

basic instruction conversion means for converting the basic instructions given from the external memory to instructions of an executable form; and selection means for selecting the instructions of the executable form produced by the basic instruction conversion means at a basic instruction mode to enable operations in accordance with the basic instructions, the selection means selecting the high-speed instructions read from the internal memory at a high-speed instruction mode to enable operations in accordance with the high-speed instructions.

14. A digital signal processing device that is connected to an external memory storing at least basic instructions and data via an address bus and a data bus, comprising:

an external adddress creation device to create external memory addresses;

an identification device to identify the basic instructions and the data respectively, and supply the external memory addresses to the external memory via the address bus, wherein the basic instructions and the data from the external memory are read and received via the data bus;

an operation device to perform an operational process with respect to the data identified by the identification device;

an internal memory to store high-speed instructions that are controlled in execution by interrupt signals and that are composed of control signals to provide longer lengths than the basic instructions, wherein an internal memory data bus width is greater than an external memory data bus width; and an address counter to continuously read the high-speed instructions from the internal memory.

15. A digital processing device according to claim 14, wherein the high-speed instructions contain a high-efficiency multiplication process to realize a speed higher than the speed realized by controlling the basic instructions.

16. A digital signal processing device according to claim 15, further comprising:

a basic instruction conversion device to convert the basic instructions from the external memory to executable instructions; and a selection device to select the executable instructions from the basic instruction conversion device at a basic instruction mode that operates based on the basic instructions, wherein the high-speed instructions are selected and read from the internal memory at a high-speed instruction mode that operates based on the high-speed instructions.

17. A digital signal processing device according to claim 14, further comprising:

a basic instruction conversion device to convert the basic instructions from the external memory to executable instructions; and a selection device to select the executable instructions from the basic instruction conversion device at a basic instruction mode that operates based on the basic instructions, wherein the high-speed instructions are selected and read from the internal memory at a high-speed instruction mode that operates based on the high-speed instructions.

18. A signal processing system, comprising:

an external memory to store at least basic instructions and data; and a digital signal processing device connected to the external memory via an address bus and a data bus;

wherein the digital signal processing device comprises an external address creation device to create external memory addresses, an identification device to identify the basic instructions and the data respectively, and supply the external memory addresses to the external memory via the address bus, wherein the basic instructions and the data from the external memory are read and received via the data bus, an operation device to perform an operational process with respect to the data identified by the identification device, an internal memory to store high-speed instructions that are controlled in execution by interrupt signals and that are composed of control signals to provide longer word lengths than the basic instructions, wherein an internal memory data bus width is greater than an external memory data bus width, and an address counter to continuously read the high-speed instructions from the internal memory.

* * * * *